Patented July 6, 1948

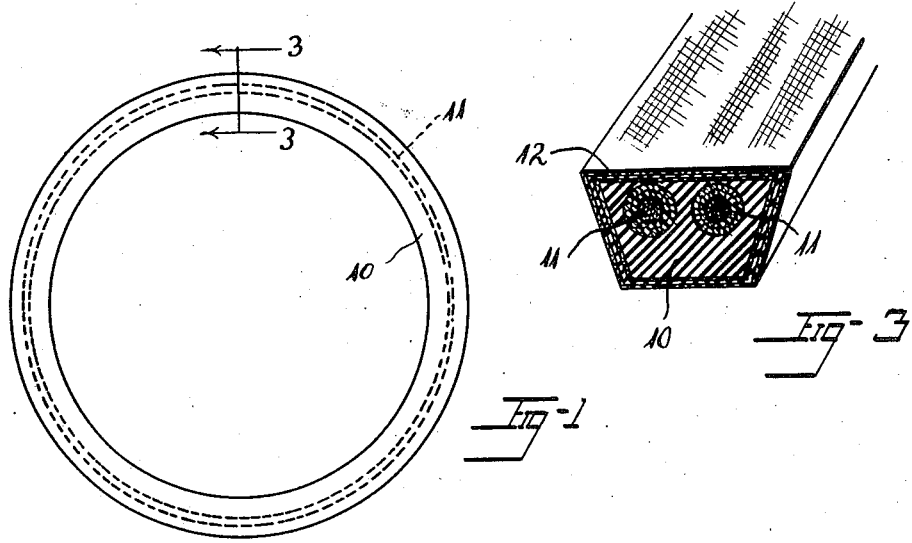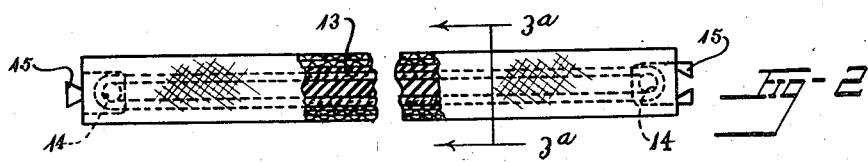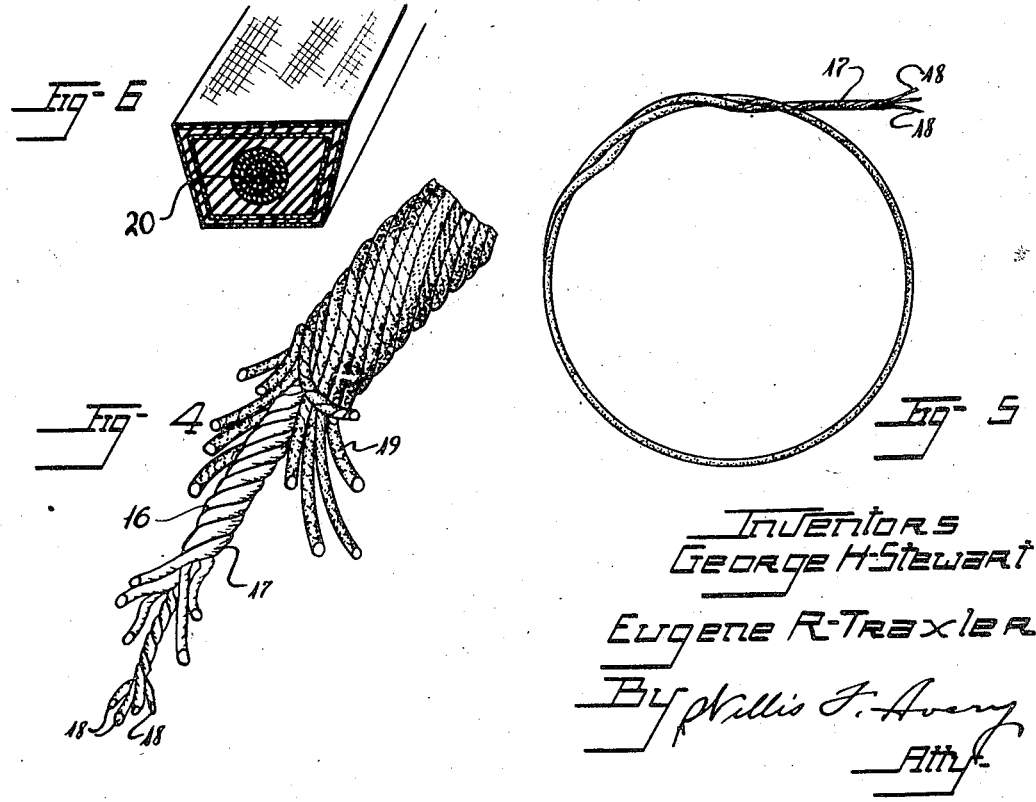

2,444,583

UNITED STATES PATENT OFFICE 2,444,583

POWER TRANSMISSION BELT

George H. Stewart, Akron, and Eugene R. Traxler, Stow, Ohio, assignors to The B. F. Goodrich Company, New York, N. Y., a corporation of New York Application July 15, 1943, Serial No. 494,786

4 Claims. (Cl. 74—233)

This invention relates to belts and especially power transmission belts of trapezoidal section for use with V-type pulleys.

An object of the invention is to provide an endless grommet or grommets as the tension resisting structure of the belt in which the advantages of wire material in the construction of the grommet are availed of to the end of obtaining greater belt strength, greater power transmitting capacity and longer life.

A further object is to provide for combining these advantages of wire material in combination with the advantages of cord material such as cotton or rayon, in the grommet construction for supplying the desired thickness of the grommet, for lateral stiffness between the side-driving faces of the belt, and extensive cord surface for strong bonding of the rubber of the belt body to the grommet, while at the same time maintaining a high degree of flexibility of the belt.

Further objects are to provide a belt utilizing the advantages of wire material in the grommet, especially the inextensible and strong character of the wire grommet which makes possible a virtually inextensible belt, while nevertheless overcoming disadvantages of wire, such as its inherent stiffness and its tendency for displacement such as to cause an unbalanced condition of the grommet, to provide a belt of increased capacity for transmitting horsepower for a given center to center tension, to provide a belt that has good flexibility and yet is exceedingly strong and is subject to very low stretch in use, to provide for maintaining good power-transmitting capacity despite the action of centrifugal force under high speeds, to provide for increased belt life, and to provide for convenience in manufacture.

These and other objects will be apparent from the following description, reference being had to the accompanying drawings in which:

Fig. 1 is a side elevation of a V-belt in endless form constructed in accordance with and embodying the invention.

Fig. 2 is a plan view of a V-belt in open-ended form, constructed in accordance with and embodying the invention, parts being broken away.

Fig. 3 is a cross section taken along the line 3—3 of Fig. 1. This cross section is identical in appearance with that taken along line 3a—3a of Fig. 2, although the belt of Fig. 1 has two grommets and the belt of Fig. 2 has but one grommet.

Fig. 4 is a fragmentary perspective view of a grommet constructed in accordance with and embodying the invention, parts being broken away for the sake of illustration.

Fig. 5 is an elevation of a strand of grommet material arranged to illustrate the manner of making up the grommet.

Fig. 6 is a cross section of a modified construction.

The invention is useful in belts of various constructions capable of having one or more endless members or grommets for the tension resisting structure. In Fig. 1 the endless V-belt comprises a body 10 of resilient rubber or other rubber-like material in which are disposed a pair of grommets 11, 11, each of a construction described more fully hereinafter. The whole belt preferably is enclosed in a cover 12 of woven fabric preferably laid with its elements on the bias. The belt components are united by vulcanization so that the body rubber 10 becomes united both to the fabric cover 12 and also the grommets 11, 11 which it surrounds.

In the open-ended V-belt of Fig. 2, a cross section along the line 3a—3a is identical in appearance with Fig. 3. In this construction, however, a single endless grommet 13 is arranged in the manner shown in Fig. 2 so that it has two parallel reaches longitudinally in the belt and so that end loops of the grommet are disposed about post members 14, 14 embedded in the belt and having extensions 15, 15 projecting at the ends of the belt for the coupling one to another of the ends of the same piece or different pieces to make the belt endless. The grommet 13 itself may be of the same construction as the grommet 11 of Fig. 1.

The grommet 11 or 13 comprises an inner core 16 which may be made up of a wire strand 17, or a plurality thereof, wound upon itself in the manner illustrated in Fig. 5 in a plurality of helically disposed full-circle courses. The strand 17 may be composed of a single wire but preferably is made up of a plurality of small wires 18, 18 cabled together. The strand 17 is wound upon itself preferably in the same helical direction throughout and while it is held in the winding machine against slippage of the turns, a strand 19 of cord of suitable material such as cotton or rayon, is wound upon the wire in a helical direction opposite to that of the wire in preferably a plurality of full-circle courses so as to give considerable bulk to the grommet, and extensive surface for adhesion of cord to the rubber of the belt, together with strength for holding the wire against unwinding and for overcoming a tendency of the wire to untwist and upset the balanced condition of the grommet as a whole. It is found that the addition of the cord winding to the wire core of the grommet in this manner satisfies these purposes effectively and at the same time does not increase stiffness of the grommet objectionably. The wire core provides the main tension resisting element of the belt, the cord normally requiring some stretch before taking the pulling load and being prevented from this by the relative inextensibility of the wire core. The cord nevertheless contributes to the general strength of the belt, and the diametrical bulk of the grommet contributed by the cord is desirable not only in affording extensive surface for adhesion to the rubber but also in providing lateral stiffness of the belt for sustaining the driving forces between the side driving faces thereof, while the belt is nevertheless flexible circumferentially. The cord also prevents the wire core from cutting through the rubber of the body.

Prior to incorporation in the rubber material of the belt the cord 19, either before being wound into the grommet or after it is so wound, is preferably treated for improving the strength of attachment of the rubber body of the belt to it. The cord may be wetted with an aqueous dispersion of rubber, natural or artificial, or a solvent cement of rubber or both may be applied after drying each previously applied coating, so that a deposit of rubber on the cord and in the interstices thereof is available for uniting the grommet with the rubber of the body during vulcanization of the belt. The wetted cord may be dried under tension, if desired, to reduce its stretchability, although this is not essential in the manufacture herein described owing to the fact that the wire core of the grommet relieves the cord of the main tension-resisting function.

Preferably the cord wrapping is securely attached to the wire core by the incorporation of rubber-like material between the wire core and the cord wrapping in the form of cement or a layer or coating of the rubber. Also, the individual wire elements of the core may be rubberized prior to forming the wire into the grommet, if desired.

In the embodiment of Fig. 6 the belt is of the same description hereinabove described with reference to Fig. 1, except that the endless belt body includes only a single grommet 20 extending in a single reach through the belt in lieu of the spaced-apart grommets of the first construction. The grommet 20 may be of the same construction as the grommet hereinabove described, and the advantages of such construction including the function of the cord winding in maintaining a balanced condition of the grommet and belt, the increased area for bonding provided by such cord winding, and the transverse stiffness to sustain driving force while the belt is nevertheless flexible circumferentially, are available in this embodiment also.

Variations may be made without departing from the invention as it is defined in the following claims.

We claim:

1. A power-transmission belt comprising a body of resilient rubber-like material, and a pair of endless grommets embedded in said body at the neutral zone of the belt, each grommet comprising wire strand material wound upon itself in full-circle courses about the great circumference of the grommet in one helical direction, and weftless cord material wound upon said wire strand material in a plurality of full-circle courses about the great circumference of the grommet in the opposite helical direction providing twist-resisting balance to the grommet and providing diametrical bulk of the grommet and resistance to cutting of the grommet into the rubber-like material of said body under the driving forces on the belt.

2. A power transmission belt of the side-driving type comprising a body portion of resilient rubber-like material and an endless grommet embedded therein at the neutral zone of the belt between the side-driving faces thereof, said grommet comprising a stretch-resisting core of wire material wound upon itself in a plurality of full-circle convolutions about the great circumference of the grommet, and weftless cord material wound upon said core in a plurality of full-circle convolutions about the great circumference of the grommet, providing diametrical bulk of the grommet between said side-driving faces of the belt and resistance to cutting of the grommet into the rubber-like material of said body under the driving forces on the belt.

3. A power transmission belt of the side-driving type comprising a body portion of resilient rubber-like material and an endless grommet embedded therein at the neutral zone of the belt between the side-driving faces thereof, said grommet comprising a stretch-resisting core of wire material wound upon itself in a plurality of full-circle convolutions about the great circumference of the grommet in one helical direction, and weftless cord material wound upon said core in a plurality of full-circle convolutions about the great circumference of the grommet in the opposite helical direction providing twist-resisting balance to the grommet and providing diametrical bulk of the grommet between said side-driving faces of the belt and resistance to cutting of the grommet into the rubber-like material of said body under the driving forces on the belt.

4. A power transmission belt of the side-driving type comprising a body portion of resilient rubber-like material, an endless grommet embedded therein at the neutral zone of the belt between the side-driving faces thereof, and a textile cover extending over said side-driving faces, said grommet comprising a stretch-resisting core of wire material wound upon itself in a plurality of full-circle convolutions about the great circumference of the grommet in one helical direction, and weftless cord material wound upon said core in a plurality of full-circle convolutions about the great circumference of the grommet in the opposite helical direction providing twist-resisting balance to the core and providing diametrical bulk of the grommet between said side-driving faces of the belt and resistance to cutting of the grommet into the rubber-like material of said body under the driving forces on the belt.

GEORGE H. STEWART.
EUGENE R. TRAXLER.

REFERENCES CITED

The following references are of record in the file of this patent:

UNITED STATES PATENTS

| Number | Name | Date |
|---|---|---|
| 899,061 | Merriman | Sept. 22, 1908 |
| 982,073 | Laird | Jan. 17, 1911 |
| 2,029,381 | Merrill et al. | Feb. 4, 1936 |
| 2,075,996 | Noyes | Apr. 6, 1937 |
| 2,257,648 | Pierce | Sept. 30, 1941 |
| 2,295,029 | Cooney et al. | Sept. 8, 1942 |

FOREIGN PATENTS

| Number | Country | Date |
|---|---|---|
| 8,515 | Great Britain | Apr. 22, 1896 |
| 15,459 | Great Britain (1908) | May 27, 1909 |
| 139,623 | Switzerland | July 1, 1930 |
| 223,318 | Great Britain | Oct. 21, 1924 |